B. B. FLAHERTY.
LOADING APPARATUS.
APPLICATION FILED DEC. 17, 1917.
1,267,200.
Patented May 21, 1918.
4 SHEETS—SHEET 2.
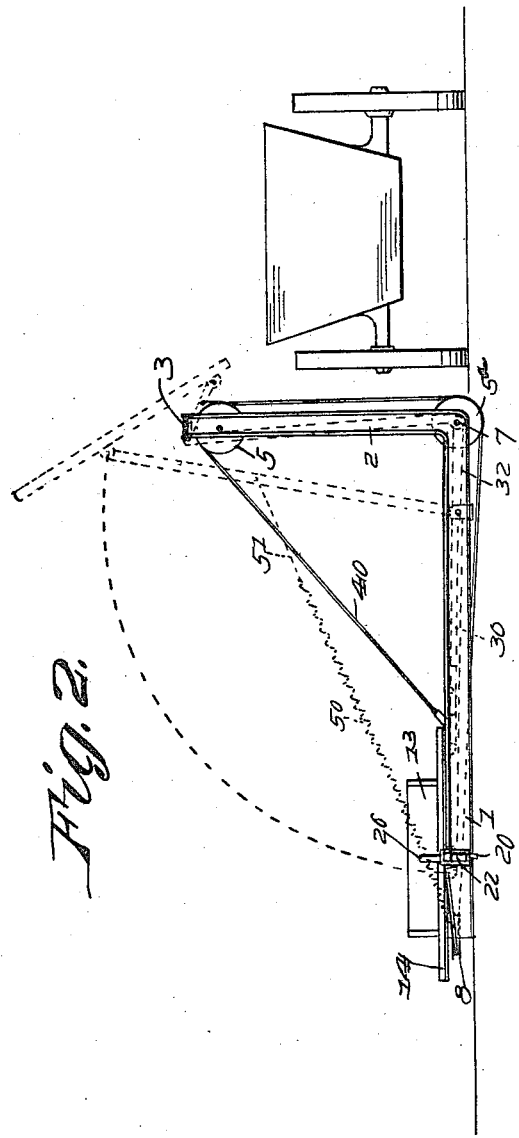
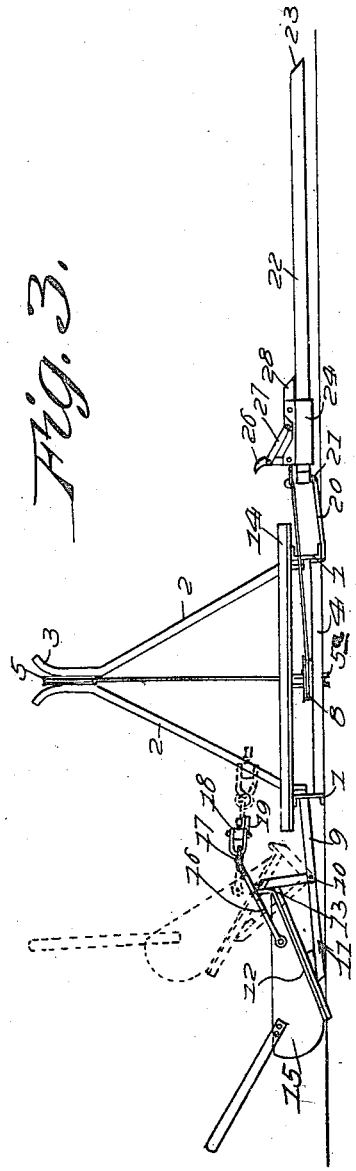
Inventor
B. B. Flaherty
By James Sheety
Attorneys.

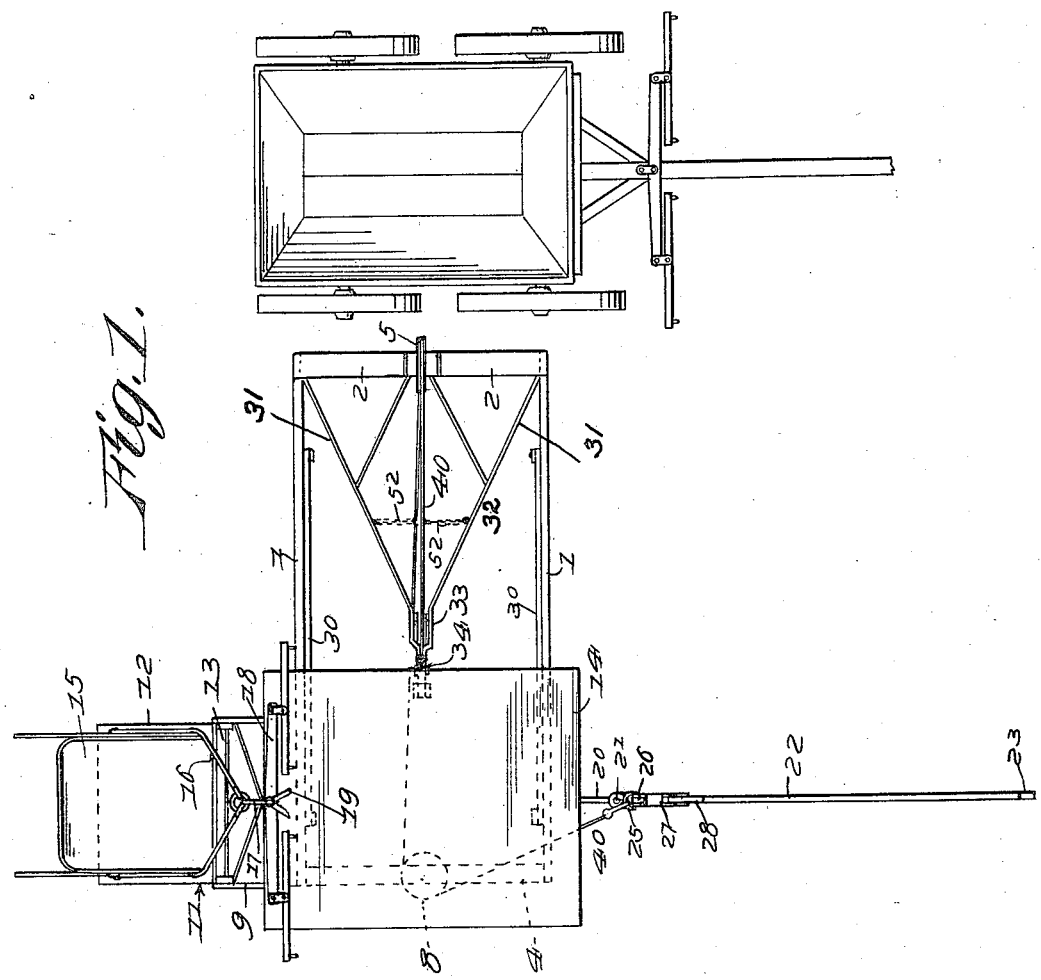

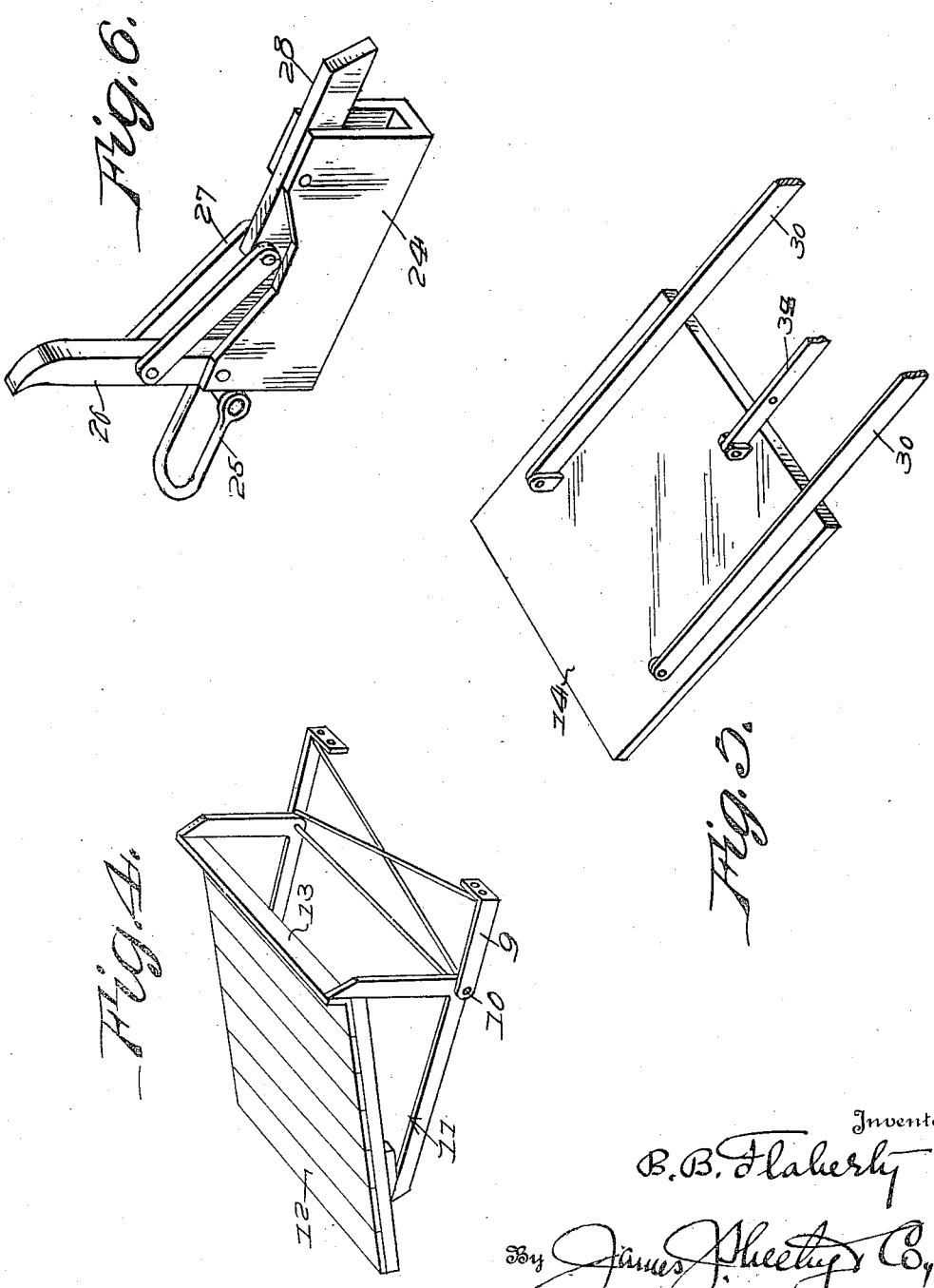

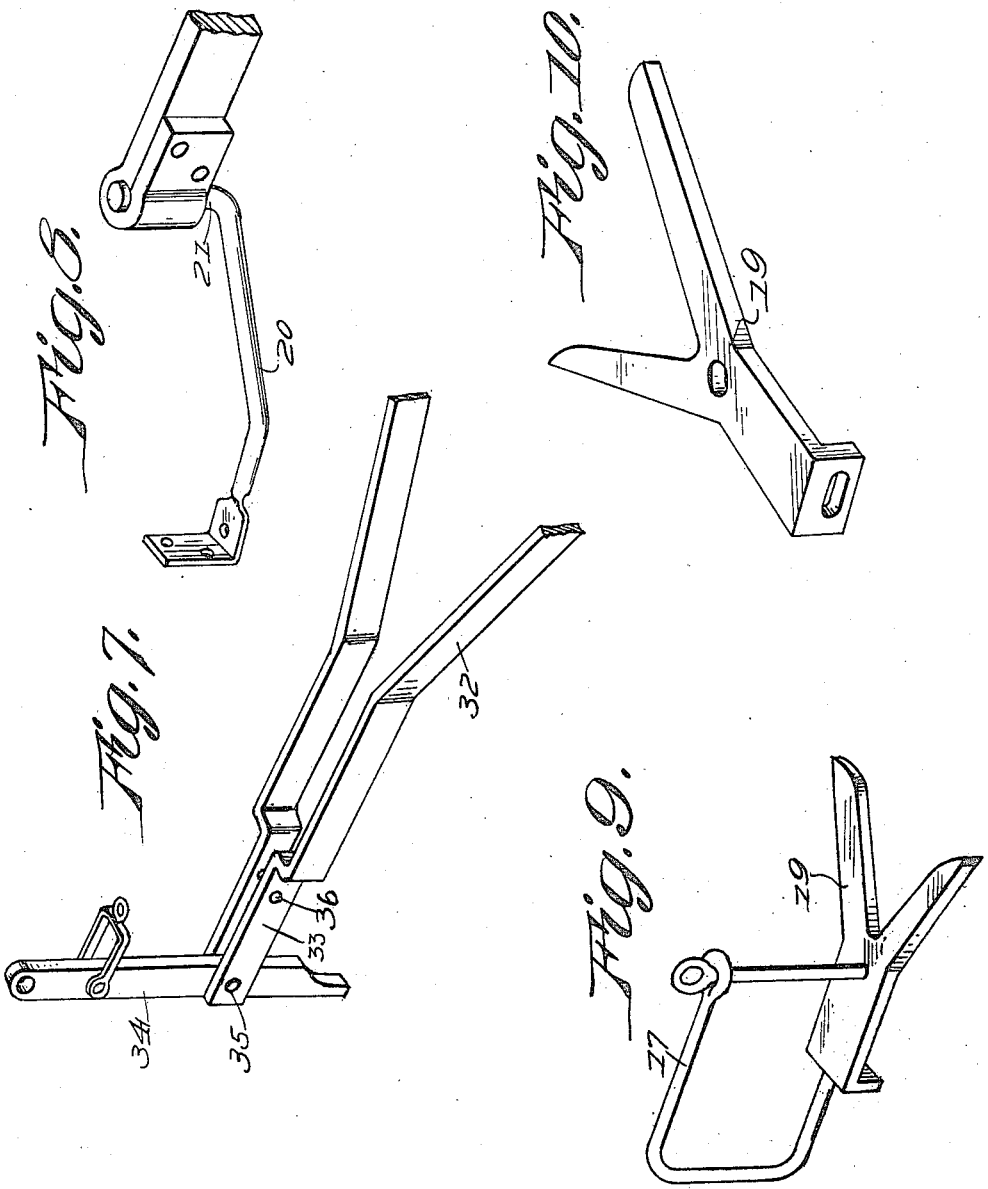

UNITED STATES PATENT OFFICE.

BERNARD B. FLAHERTY, OF DAVENPORT, IOWA.

LOADING APPARATUS.

1,267,200.  Specification of Letters Patent.  Patented May 21, 1918.

Application filed December 17, 1917. Serial No. 207,525.

*To all whom it may concern:*

Be it known that I, BERNARD B. FLAHERTY, a citizen of the United States, residing at Davenport, in the county of Scott and State of Iowa, have invented new and useful Improvements in Loading Apparatus, of which the following is a specification.

My invention pertains to apparatus for loading wagons and other vehicles; and it consists in the peculiar and advantageous construction, novel and useful combinations, and adaptation of parts as hereinafter described and definitely claimed.

In the accompanying drawings which are hereby made a part hereof:

Figure 1 is a plan view showing my novel apparatus properly arranged relative to a wagon to be loaded.

Fig. 2 shows the apparatus in side elevation and the wagon in end elevation.

Fig. 3 is a rear end elevation of the apparatus.

Fig. 4 is an enlarged detail perspective of the approach of the apparatus.

Fig. 5 is a perspective of the platform in inverted position.

Fig. 6 is a perspective showing the slidable carriage and its appurtenances.

Figs. 7, 8, 9 and 10 are enlarged details of elements comprised in the apparatus.

Similar numerals of reference designate corresponding parts in all of the views of the drawings.

My novel apparatus is designed to be positioned at the side of a driveway to receive a load of dirt on a platform from a scraper hauled over the platform and is also adapted to utilize the team drawing the scraper to raise the platform so as to discharge the load deposited on the platform into a wagon body, whereupon the team is automatically released from the apparatus and driven off for another scraper load, and the platform is left free to gravitate to its normal position, and, by so doing, to return all of the other working parts to their normal positions.

Among other elements the apparatus comprises a main frame which in practice stands at right-angles to a driveway and includes a horizontal portion and an upright portion at the forward end of the horizontal portion. The said main frame is made up of horizontal parallel bars 1, upwardly converged bars 2 that rise from the forward ends of the bars 1 and have outwardly inclined upper end portions 3, and lower and upper cross-bars 4 that connect the rear ends of the bars 1. A vertically-disposed sheave 5 is mounted between the upper portions of the bars 2, and a second vertically-disposed sheave 5ª is mounted between and on a shaft 7 that extends between the forward portions of the bars 1, while a horizontally-disposed sheave 8 is carried between the cross-bars 4.

Fixed to and extending laterally from the left-hand bar 1 of the main frame are brackets 9, and pivoted at 10 to the said brackets is the frame 11 of a vertically-swinging approach 12 which is provided at its forward or inner end with an abutment 13.

14 is the vertically-movable platform of the apparatus which is designed to normally rest in horizontal position on the bars 1 of the main frame, and 15 is a slip-scraper connected through a bail 16 and a clevis 17 with a doubletree 18; the clevis 17 being provided with a horizontal V-shaped tappet 19 for a purpose hereinafter set forth.

Fastened to the right-hand bar 1 of the main frame and extending laterally therefrom is a bolt 20, having an upstanding portion 21, and pivoted to swing horizontally on said upstanding portion is a horizontal bar 22, the free end of which is beveled as indicated by 23.

Movable lengthwise on the bar 22 is a carriage 24 having a clevis 25 at its rear end, and pivoted to the said carriage 24 is a hook 26, provided for engagement of the tappet 19 on the clevis 17. The said hook 26 is connected through a link 27 with a lever member 28 fulcrumed in the carriage.

The said member 28 is held in horizontal position by the bar 22 and hence serves to maintain the hook 26 in upright position while the carriage is being moved by the tappet 19 toward the beveled end of the bar. When, however, the lever member 28 reaches said beveled end 23, the forward arm of said lever member is free to swing downwardly, with the result that the hook 26 is rendered free to swing forwardly and thereby release the tappet 19.

The operation of the mechanism thus far described is as follows:

The scraper drawn by a two-horse team is loaded in the ordinary well known manner, and is guided on the approach 12, one horse crossing the frame bars 1 at one side of the platform 14 (then in horizontal position) and the other horse passing at the other side or rear of said platform. When the scraper contacts with the abutment 13 of the approach 12, the approach will be swung upwardly on its hinges and the scraper will be turned over so as to deposit its load on the platform 14, and at the same time the scraper will be drawn clear of the approach 12 which will then gravitate back to its normal position. The scraper will be supported above the deposited load by the abutment 13 of approach 12 and hence will not drag the load off the plaform, and as the team proceeds the tappet 19 will engage the hook 26 and move the carriage to the outer end of the bar 22, whereupon the tappet 19 will be released from the hook 26, so as to permit of the scraper 15 being carried off for another load. The described outward movement of the carriage 24 is utilized to raise the platform 14 for the dumping of the load of the latter into a wagon body as will now be described.

Pivotally connected to the main frame bars 1 are the rear supports 30 of the platform 14, said rear supports being pivotally connected at their upper ends to brackets at the underside of the platform. Also pivotally connected to the frame bars 1 are the arms 31 of the forward support 32 of the platform 14, said support 32 being pivotally connected on the underside of the platform with brackets and being arranged to swing parallel with the rear supports 30 so as to maintain the platform in horizontal position incidental to the upward and forward movement thereof. The said forward support 32 is made up of a lower bifurcated section 33 and an upper section 34 which is pivoted at 35 to the section 33 and is provided with an arm depending from said pivot point 35 and adapted to bear forwardly against a stop bolt 36 in the section 33; the said depending arm being notched to receive the bolt 36 so as to enable the sections 33 and 34 to rest in alined position during the upward and forward movement of the platform 14. A cable 40 is connected at one end to the upper section 34 of the support 32, and is passed around the sheaves 5, 5ª and 8 in the order named, and connected at the opposite end to the clevis 25 on the carriage 24. Thus when the platform 14 is in its lowermost position and the carriage 24 is drawn outwardly on the bar 22, the cable 40 through the medium of the support 32 will raise and move the platform 14 forwardly. When the lower portion of the forward support 32 strikes the upright portion of the main frame, the top section 34 swings forwardly because of the movement created by the upward motion of the platform combined with slight pull of the cable forwardly and downwardly, the lower section 33 resting all the while against the frame portion 2. This action occurs before the hook 26 releases the doubletree, and the same is necessary to overcome the stretch of the cable. This will be better understood when it is stated that if the hook reached the end of the bar before the platform reached the point of dumping the platform would fall backwardly with its load.

The described forward swinging of the top section 34 will permit the forward portion of the platform to swing downwardly with the result that the load on the platform 14 will be discharged into a wagon body placed to receive it. The supports 30 and 32 will then swing backwardly with the platform 14 until the platform rests in its lowermost normal position, and during such movement the support 32 through the medium of the cable 40 will draw the carriage 24 back to the initial position on the bar 22.

When deemed expedient a retractile spring 50 may be employed to start the backward and downward movement of the supports and the platform 14. One end of the said spring is connected to the upper cross bar 4 of the main frame and the other end thereof is connected through a cable 51 and branch cables 52 with the rear supports 30.

During the upward movement of the forward support of the platform the weight imposed on the platform will operate to prevent buckling of the upper section 34 of the forward support. When, however, the lower section 33 brings up against the upright of the main frame the continued pull on the upper arm of section 34 will cause said arm to swing forwardly of the lower section 33 with the result that the forward portion of the platform will be tipped downwardly, and its load will be discharged into a wagon.

It will be gathered from the foregoing that by the practice of my invention the dirt is taken up and loaded into a wagon body in one continuous operation involving the employment of the same horses and men, and with but little effort on the part of men and horses.

Having described my invention, what I claim and desire to secure by Letters-Patent, is:

1. In a loading apparatus, the combination of a main frame comprising a horizontal portion and an upright portion that rises from the forward end of the horizontal portion, sheaves mounted in the main frame, a bar connected with and extending laterally from one side of the main frame, a carriage movable on the bar in the direction of the length thereof, a hook pivoted on the carriage, a lever member pivoted on the carriage and connected with the hook and constructed and arranged to maintain the hook in upright position until it reaches the end of the bar, an approach hinged to the opposite side of the main frame, with reference to the bar and carriage, and having an abutment at its inner end, a platform, a vertically-swinging support for the platform, hinged to the main frame, a cable interposed between and connecting the carriage and said support and passed around the said sheaves, and a means constructed and arranged to engage the abutment on the approach and equipped with a tappet adapted to engage the hook of the carriage.

2. The combination in a loading apparatus of a bar having a beveled free end, a carriage movable on said bar, a hook pivoted to and adapted to extend upwardly from the carriage, a lever member pivoted on the carriage and arranged to coöperate with the bar in maintaining the hook in upright position and also adapted to be released by the beveled end of the bar, and a link interposed between and connecting the hook and said lever member.

3. The combination in a loading apparatus, of a main frame having a horizontal portion, an arm connected to and extending laterally from said horizontal portion and having an upstanding free end, a bar mounted on said end to swing horizontally and having a beveled end, a carriage movable on the bar, a hook pivoted to the carriage, a lever member also pivoted to the carriage and adapted to coöperate with the bar and the beveled end thereof, and a link connecting the hook and the lever member.

4. In a loading apparatus, the combination of a main frame, a vertically-swinging platform, and a vertically swinging approach pivoted at one side of the main frame and having an abutment on its inner portion constructed and arranged to be engaged by a draft means whereby the approach is swung upwardly.

5. In a loading apparatus, the combination of a main frame, a vertically-swinging platform connected therewith, brackets fixed to and extending from one side of the main frame at points opposite the platform when the latter is in its lowermost position, and a vertically-swinging approach pivoted to said brackets and having an abutment on its inner end portion constructed and arranged to be engaged by a draft means whereby the approach is swung upwardly.

6. In a loading apparatus, the combination of a main frame, a vertically-swinging platform connected therewith, a carriage movable away from and toward one side of the frame, a connection between the platform and the carriage for moving the former by the latter, an approach pivoted to the opposite side of the main frame with reference to the carriage and having means for the engagement of a draft means, and coöperating means on the draft means and the carriage whereby the carriage is moved outwardly by the traverse of the draft means and is then released.

7. In a loading apparatus, the combination of a main frame having a horizontal portion and an upright portion rising from the forward end of the horizontal portion, sheaves mounted in said main frame, a vertically-movable platform, rear supports pivoted to the horizontal portion of the main frame and the platform, a forward support pivoted to the main frame and having an upper section hinged at an intermediate point of its length to the lower section and also having means on the lower section for limiting rearward movement of the depending portion of the upper section; said forward support being arranged when swung upwardly and forwardly to bring up against the upright portion of the main frame, and a cable for raising the platform; said cable being passed around said sheaves and connected at one end to the upper section of the forward support of the platform.

8. In a loading apparatus, the combination of a main frame, having a horizontal portion and an upright portion rising from the forward end of the horizontal portion, sheaves mounted in said main frame, a vertically-movable platform, rear supports pivoted to the horizontal portion of the main frame and the platform, a forward support pivoted to the main frame and having an upper section hinged at an intermediate point of its length to the lower section and also having means on the lower section for limiting rearward movement of the depending portion of the upper section; said forward support being arranged when swung upwardly and forwardly to bring up against the upright portion of the main frame, a bar connected with and extending laterally from one side of the horizontal portion of the main frame and having a beveled free end, a carriage movable lengthwise on said bar, a hook pivoted on the carriage, a lever pivoted on the carriage and arranged to coöperate with the bar and the beveled end thereof, a link connecting the hook and lever member, a cable passed around the sheaves and connecting the carriage with the upper section of the forward support of the platform, and means for engaging the hook on the carriage and thereby moving the carriage outwardly on the bar.

9. The combination in a loading apparatus, of a main frame, sheaves mounted therein, a carriage supported and movable laterally at one side of the main frame, a hook pivoted on the carriage, means for maintaining the hook in working position during traverse of the carriage and then releasing the same, an approach hinged at the opposite side of the main frame, with reference to the carriage, and having an abutment, a platform, vertically-swinging supporting means for the platform, hinged to the main frame, a cable connecting the supporting means and the carriage and passed around the said sheaves, and a draft means constructed and arranged to engage the abutment on the approach and equipped with a tappet adapted to engage the hook of the carriage.

10. In a loading apparatus, the combinatio of a stationary upright having a sheave, a platform constructed and arranged to move upwardly and forwardly, a vertically swinging forward support for the platform; said support comprising a lower section, and an upper section pivoted at an intermediate point of its length to the lower section and having its upper arm pivoted to the platform and its lower arm adapted to bring up against a stop on the lower section, and a cable connected to the upper arm of said upper section and passed over said sheave.

In testimony whereof I have hereunto set my hand in presence of two subscribing witnesses.

BERNARD B. FLAHERTY.

Witnesses:
S. S. STOWELL,
W. H. CREMMAN.

Copies of this patent may be obtained for five cents each, by addressing the "Commissioner of Patents, Washington, D. C."